Figure 1:
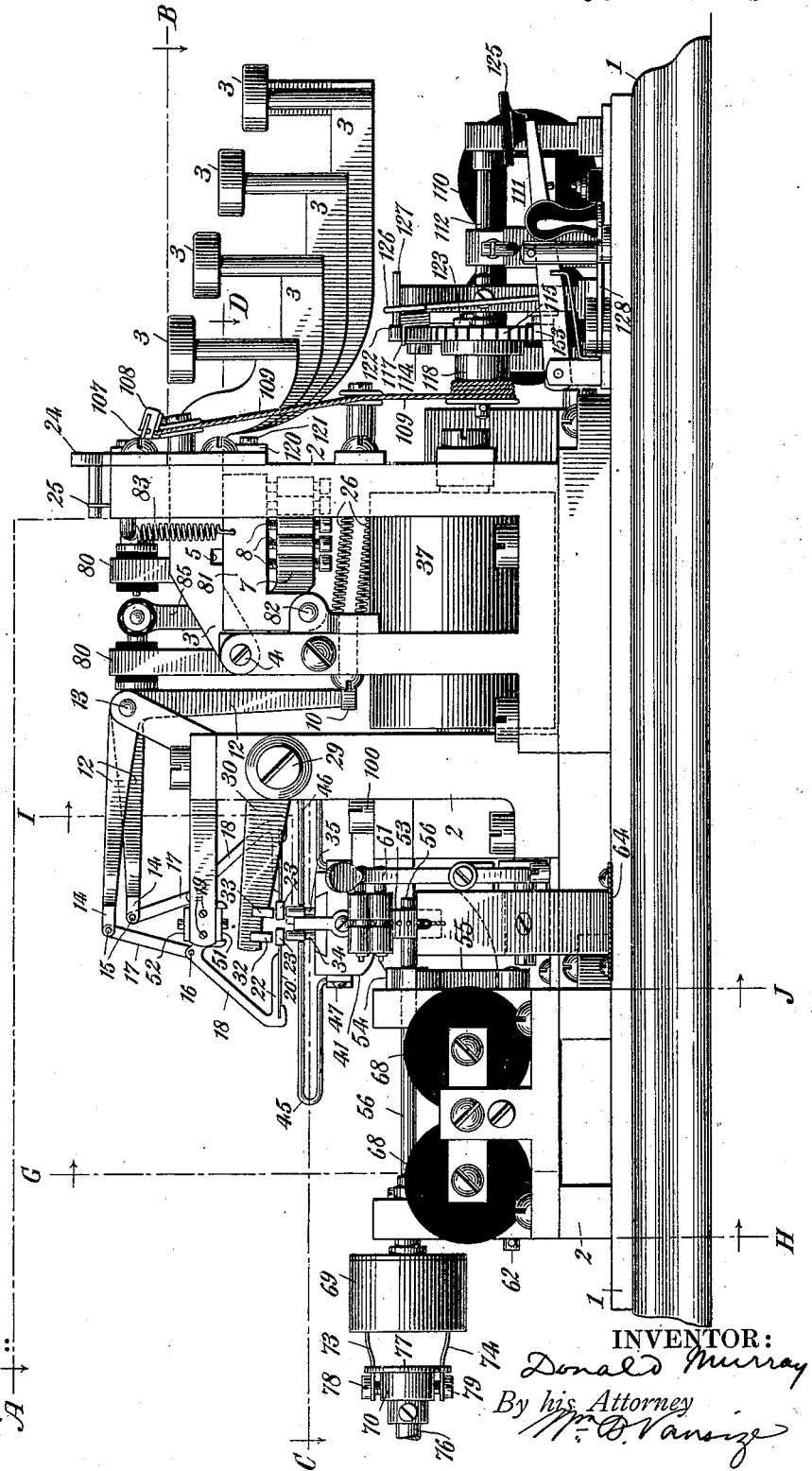

No. 710,163. Patented Sept. 30, 1902.
D. MURRAY.
KEYBOARD PERFORATOR.
(Application filed July 20, 1901.)
(No Model.) 9 Sheets—Sheet 1.

WITNESSES:
C. E. Ashley
G. M. Dowling

INVENTOR:
Donald Murray
By his Attorney
Wm. D. Vansize

No. 710,163. Patented Sept. 30, 1902.
D. MURRAY.
KEYBOARD PERFORATOR.
(Application filed July 20, 1901.)

(No Model.) 9 Sheets—Sheet 2.

WITNESSES: INVENTOR:
C. E. Ashley Donald Murray
A. M. Donley By his Attorney
Wm B. Vansize No. 710,163. Patented Sept. 30, 1902.
D. MURRAY.
KEYBOARD PERFORATOR.
(Application filed July 20, 1901.)

(No Model.) 9 Sheets—Sheet 4.

WITNESSES:
C. E. Ashley
A. M. Donleby

INVENTOR:
Donald Murray
By his Attorney

No. 710,163. Patented Sept. 30, 1902.
D. MURRAY.
KEYBOARD PERFORATOR.
(Application filed July 20, 1901.)
(No Model.) 9 Sheets—Sheet 5.

WITNESSES:
C. E. Ashley
A. M. Donlevy

INVENTOR:
Donald Murray
By his Attorney
Wm. B. Vansize

No. 710,163. Patented Sept. 30, 1902.
D. MURRAY.
KEYBOARD PERFORATOR.
(Application filed July 20, 1901.)
(No Model.) 9 Sheets—Sheet 6.
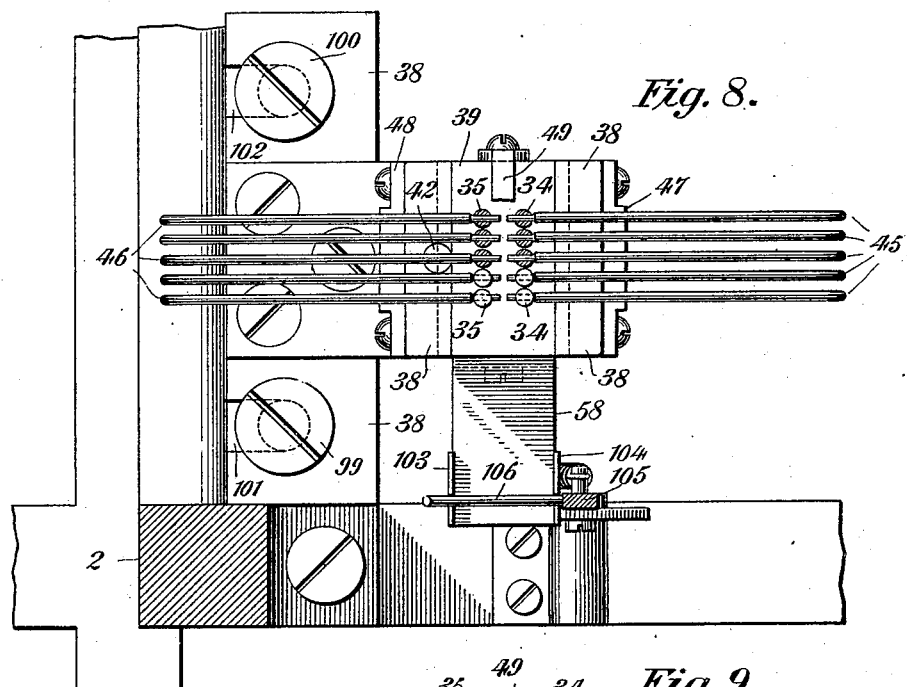
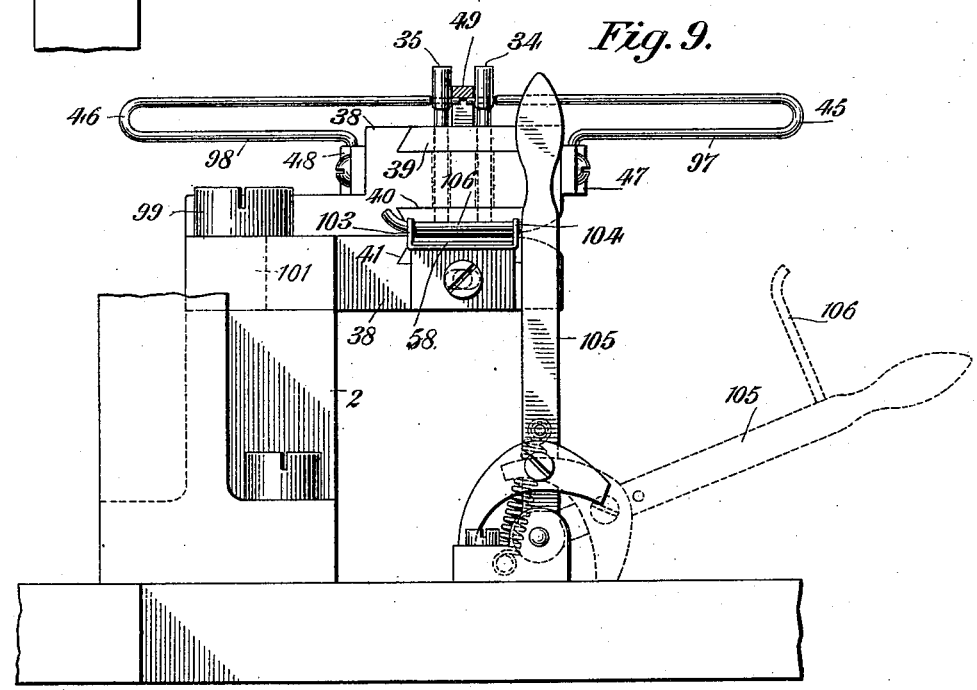

No. 710,163. Patented Sept. 30, 1902.
D. MURRAY.
KEYBOARD PERFORATOR.
(Application filed July 20, 1901.)
(No Model.) 9 Sheets—Sheet 7.
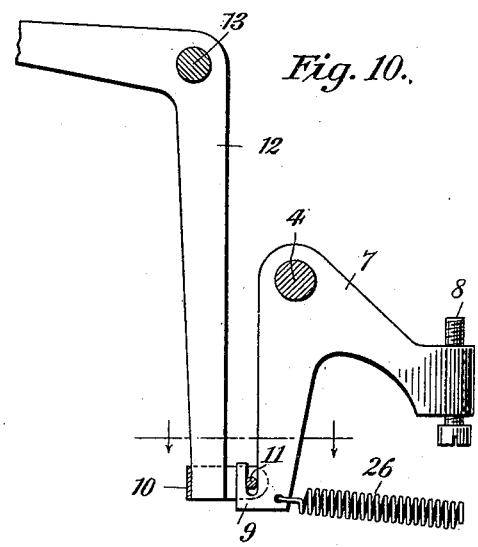
Fig. 10.
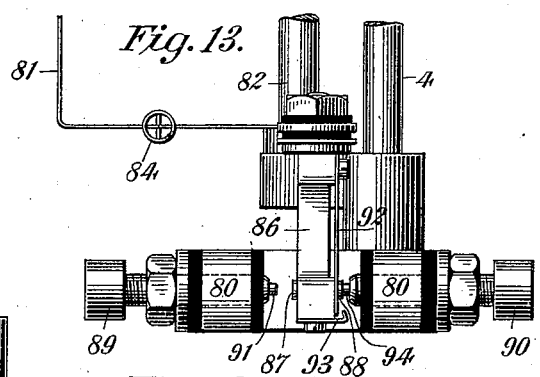
Fig. 13.
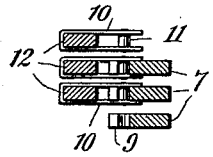
Fig. 11.
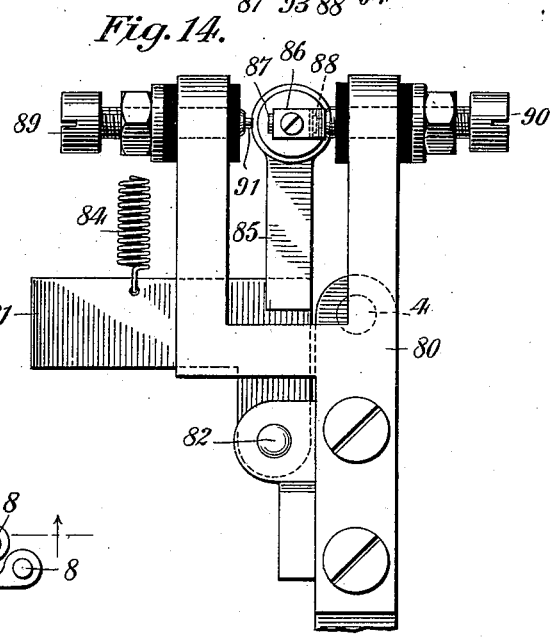
Fig. 14.
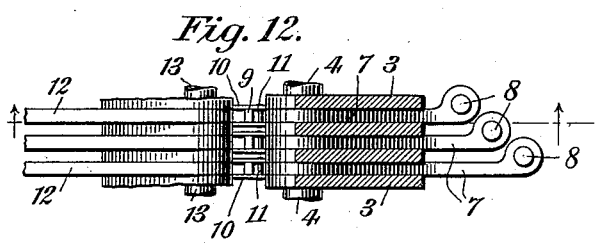
Fig. 12.
Fig. 15. Fig. 16. Fig. 17. Fig. 18.
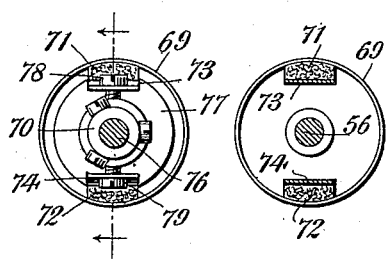 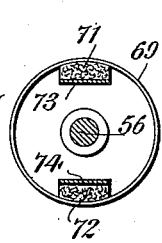 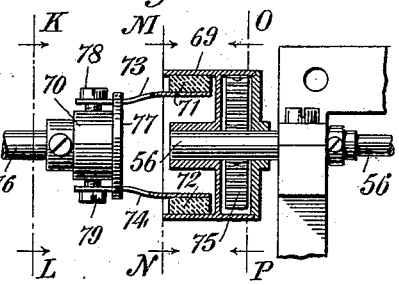 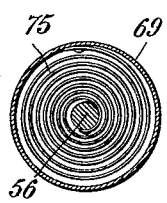
WITNESSES:
C. E. Ashley
A. M. Donley
INVENTOR:
Donald Murray
By his Attorney
Wm. B. Vansize No. 710,163. Patented Sept. 30, 1902.
D. MURRAY.
KEYBOARD PERFORATOR.
(Application filed July 20, 1901.)
(No Model.) 9 Sheets—Sheet 8.

WITNESSES:
C. E. Ashley
A. M. Donlevy

INVENTOR:
Donald Murray
By his Attorney
Wm. D. Vansize

No. 710,163. Patented Sept. 30, 1902.
D. MURRAY.
KEYBOARD PERFORATOR.
(Application filed July 20, 1901.)
(No Model.) 9 Sheets—Sheet 9.

WITNESSES:
C. E. Ashley
A. M. Donlevy

INVENTOR:
Donald Murray
By his Attorney

UNITED STATES PATENT OFFICE.

DONALD MURRAY, OF NEW YORK, N. Y.

KEYBOARD-PERFORATOR.

SPECIFICATION forming part of Letters Patent No. 710,163, dated September 30, 1902.

Application filed July 20, 1901. Serial No. 69,041. (No model.)

*To all whom it may concern:*

Be it known that I, DONALD MURRAY, a subject of the King of Great Britain, residing in New York city, county and State of New York, have made certain new and useful Improvements in Keyboard-Perforators, of which the following is a specification.

My invention relates to mechanism for the production, by means of the ordinary typewriter keyboard, of a perforated paper tape or strip, such as is used in various systems of automatic telegraphy, but more especially in connection with the modification of the Wheatstone automatic transmitter employed in the printing-telegraph system shown and described in my United States Letters Patent Nos. 653,934, 653,935, and 653,936, dated July 17, 1900, and No. 670,964, dated April 2, 1901. One characteristic of said system is that it employs an alphabet in which the letters or characters are of equal length, and the present improvements are arranged to produce groups of perforations each of which occupies the same length or distance on the tape. The tape is therefore fed along the same total distance or length for each letter or character.

The objects of my invention are, first, to provide a more simple and reliable paper-feed than can be employed where the letters or characters are of varying length; second, to provide a paper-feed in which such feed step is divided into substeps or sections; third, to provide simpler and quicker-operating selecting and punch-actuating devices than heretofore, and, fourth, to provide for automatically blocking the operation of the key-levers after a predetermined number of letters or spaces have been perforated.

I prefer to employ an ordinary keyboard, like a type-writer keyboard. Each key is a selecting device designed to operate one or more of a series of "fiddle-bows," which control a series of small punch-blocks. These are automatically inserted and withdrawn at points between a universal striker-bar and a gang of punches in a die-block, through which the paper tape is passed in the process of perforation. The paper-feed is driven by a constantly-operating motor. The motor-driven shaft is connected to the sprocket-wheel shaft by a friction-clutch and a helical spring. The punching is done by an electromagnet which operates a universal striker-bar. The spacing mechanism is operated by another electromagnet controlling the motor-driven escapement.

A distinctive feature of the invention is the method of feeding the tape. There are two electrical contacts—one for spacing and one for punching. The spacing-contact is normally closed. Depressing a key breaks the spacing-circuit, and the tape is fed forward a fraction of the distance allowed to each letter. The punching-contact then closes, operating the punching mechanism. On releasing the key the punching-circuit is broken and the spacing-circuit again closed. The closing of the spacing-circuit feeds the tape forward the remaining fraction of the distance allotted to each letter. The advantage of this arrangement is that it divides into two parts the distance that the tape has to be fed forward for each letter—that is to say, assuming that the tape has to be fed forward half an inch for each letter then the tape is fed forward, say, one-third of that distance just before punching and the remaining two-thirds just after punching. This division of the feed into two steps increases the speed of the machine and decreases the wear and tear of the mechanism.

Figure 2:
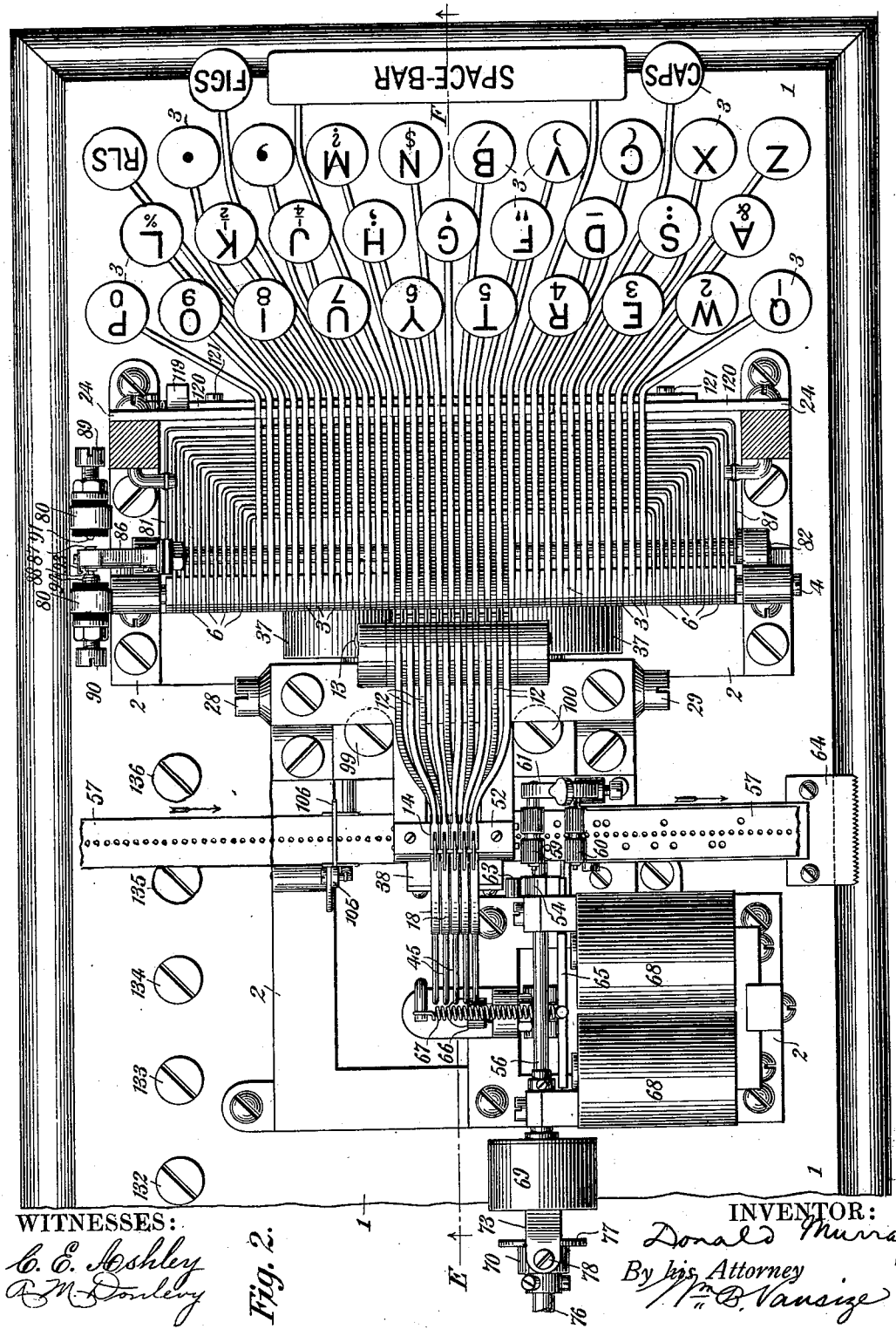
Figure 3:
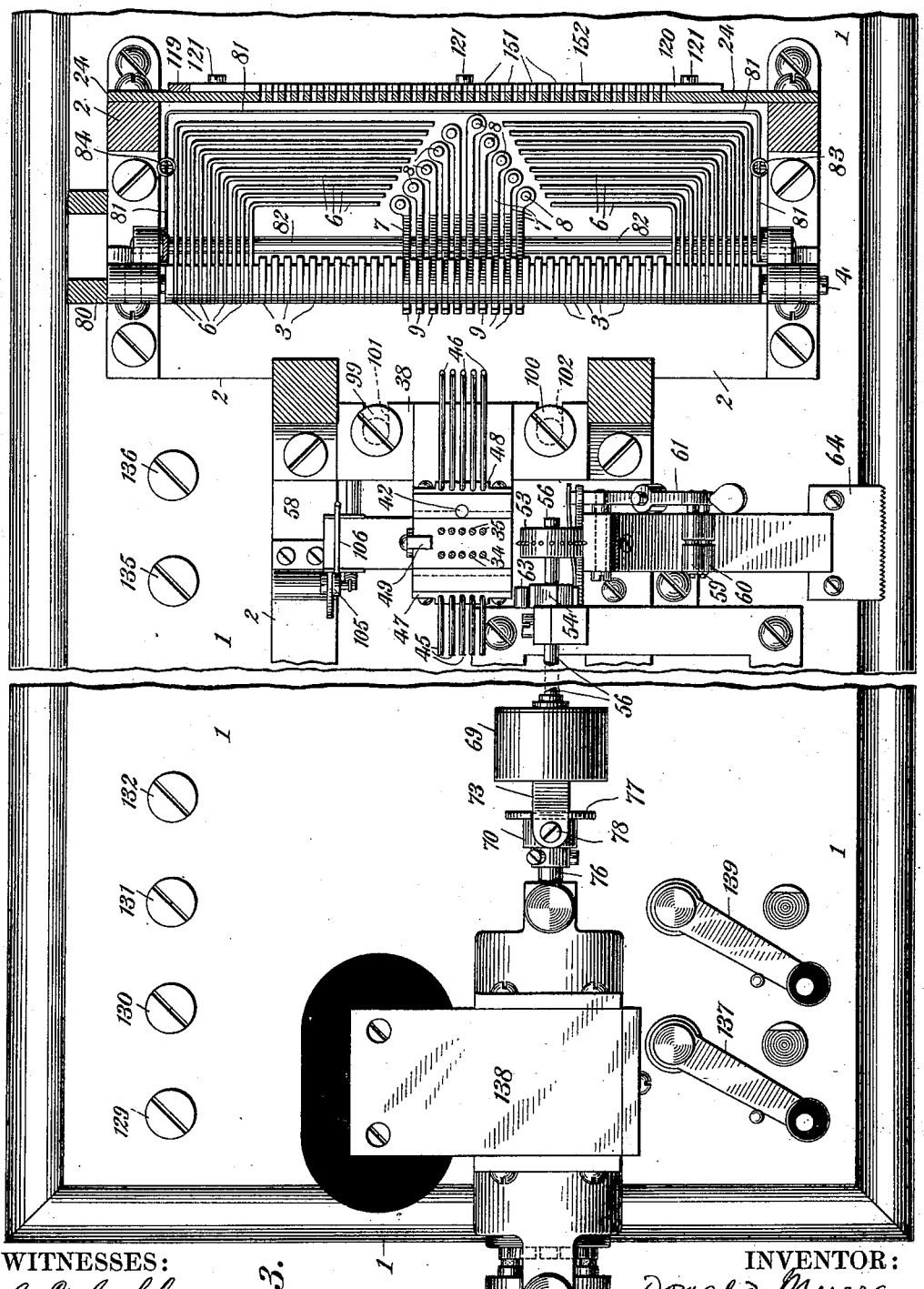
Figures 4, 5:
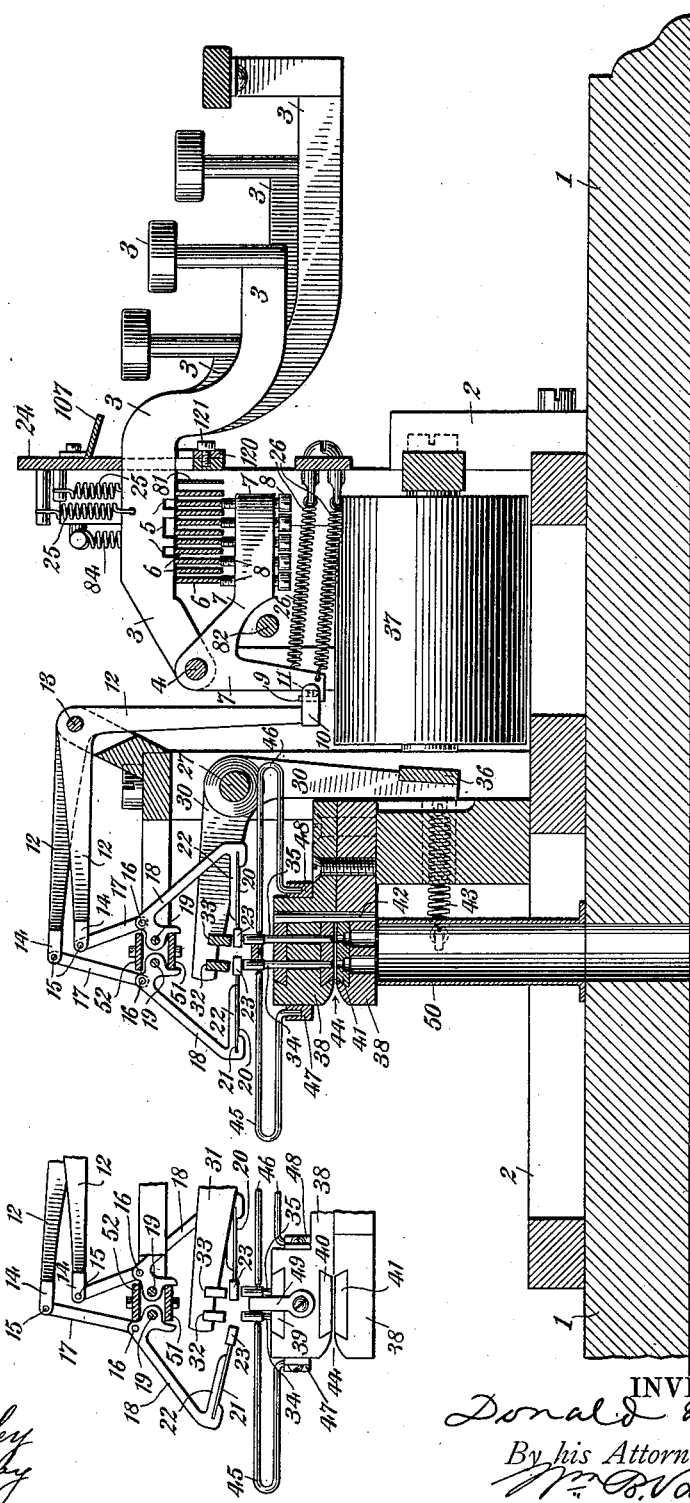
Figure 6:
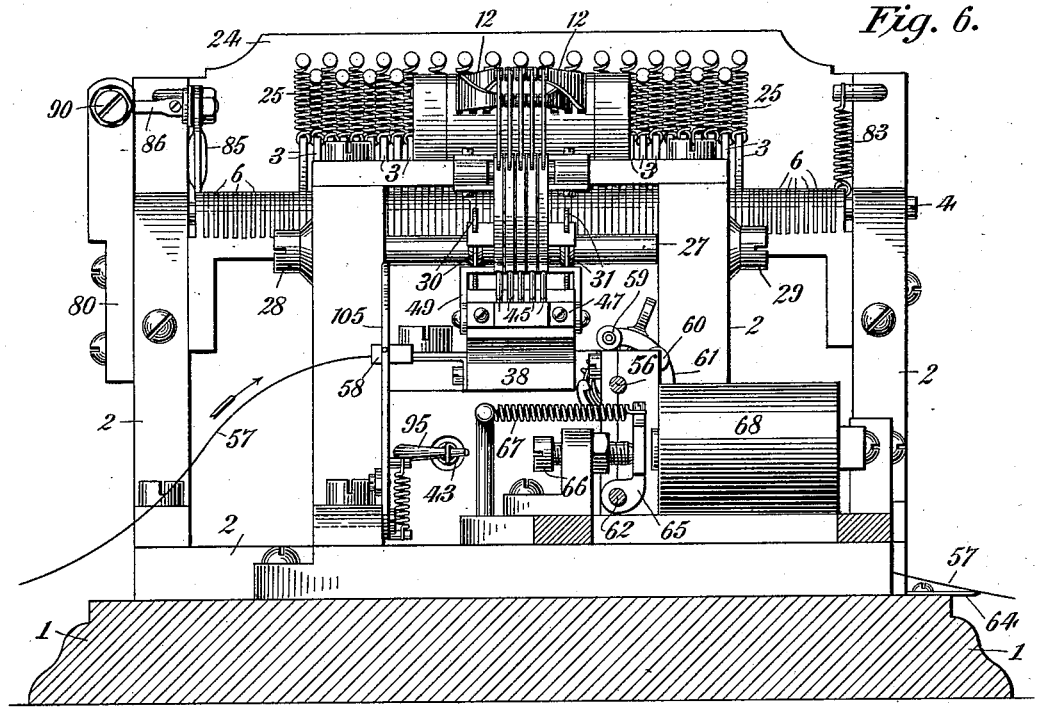
Figure 7:
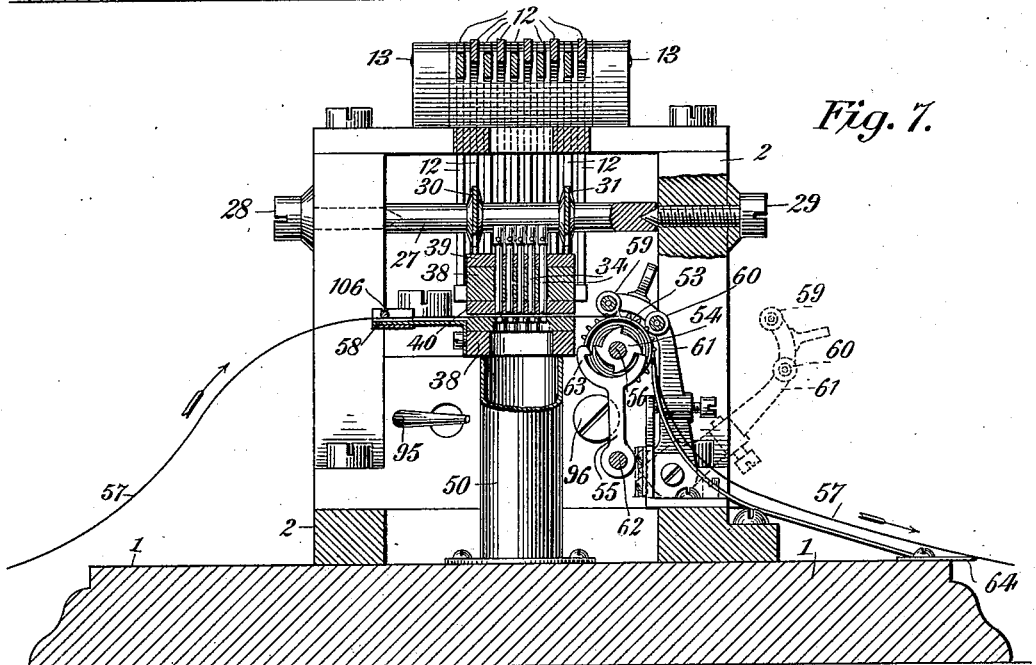
Figure 19:
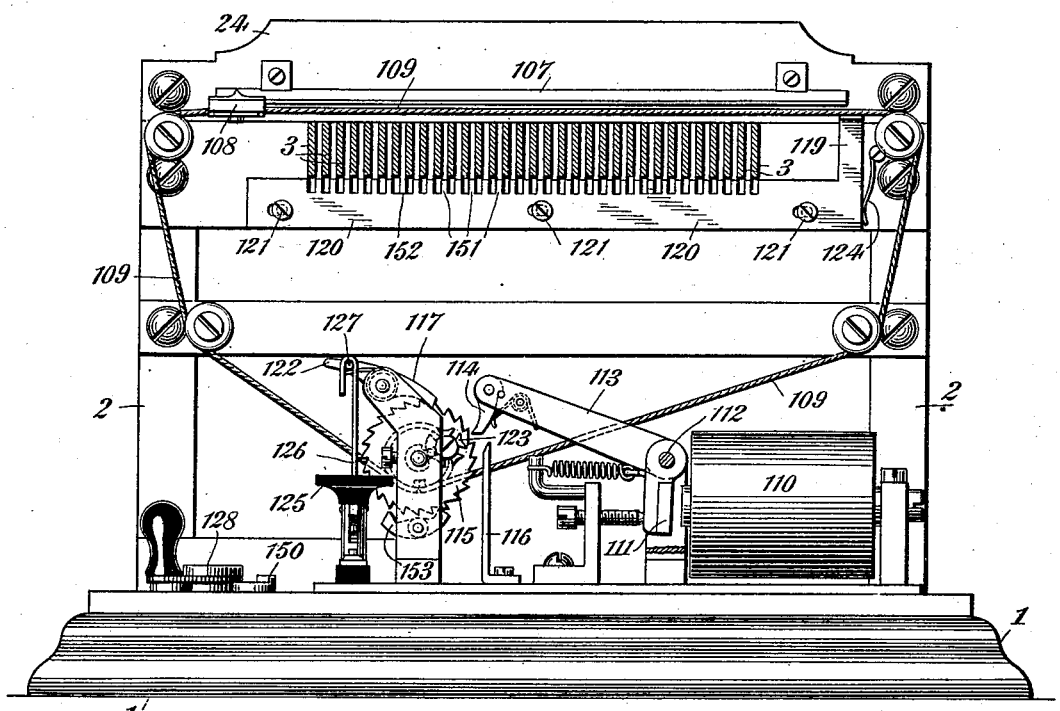
Figure 20:
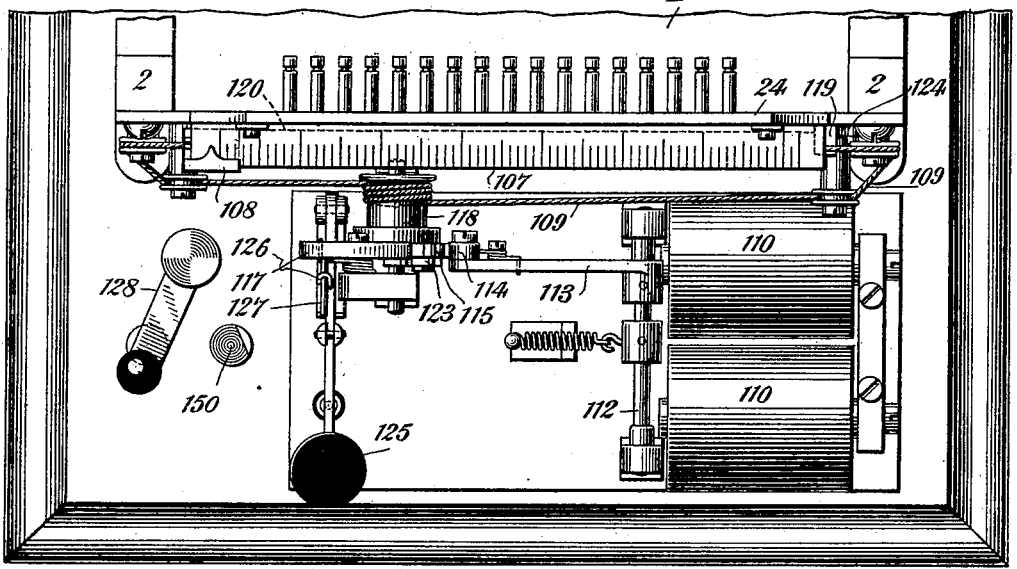
Figure 21:
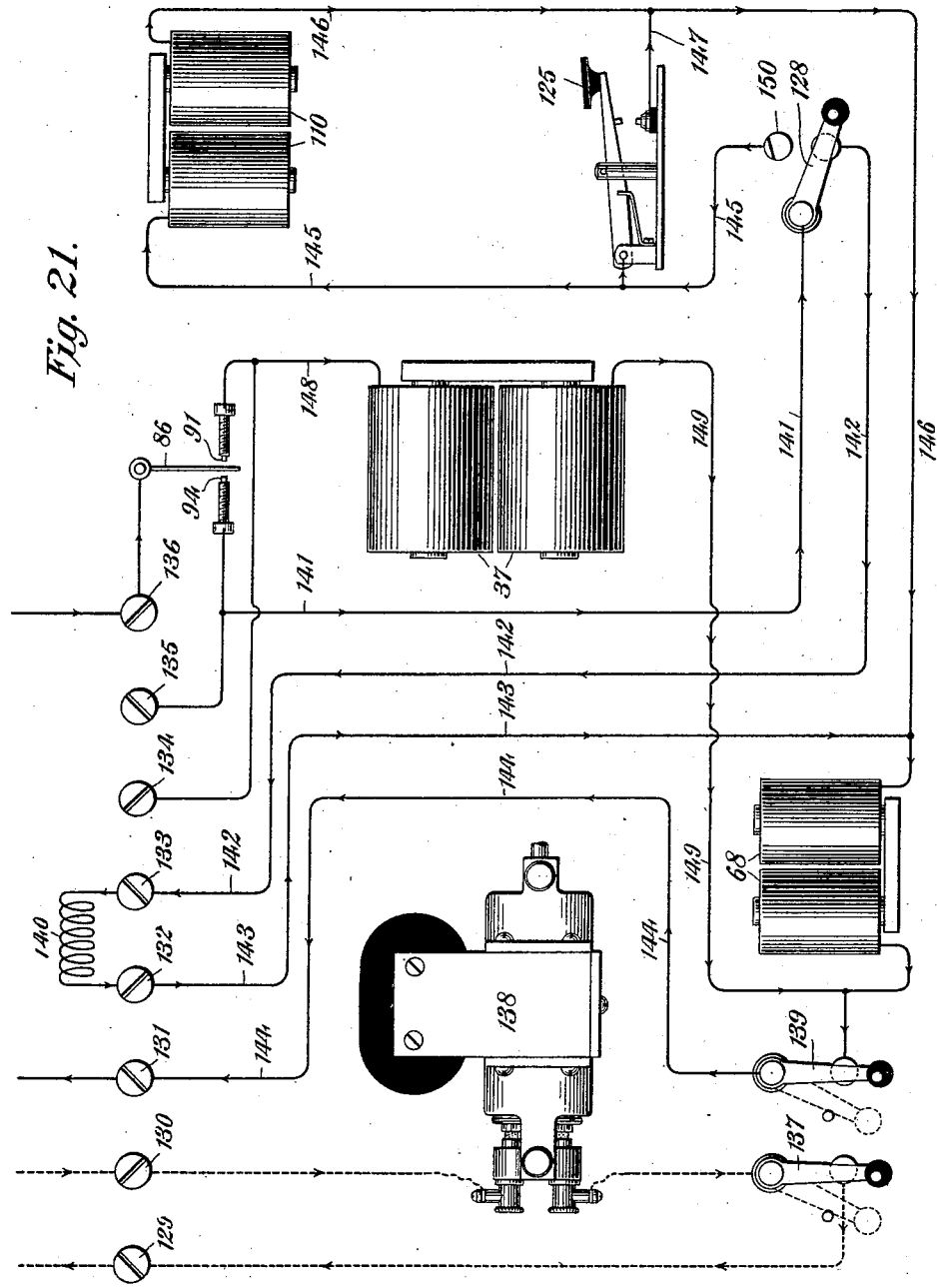

In the accompanying drawings, Figure 1 is a side elevation of the perforating-machine. Fig. 2 is a plan view of the same, partly in section, on the line A B, Fig. 1. Fig. 3 is a broken plan view sectioned on the line C D, Fig. 1. Fig. 4 is a side elevation sectioned on the line E F, Fig. 2. Fig. 5 is a detail view showing the operation of part of the mechanism in Fig. 4. Fig. 6 is a cross-section of the machine on the line G H, Fig. 1. Fig. 7 is a cross-section on the line I J, Fig. 1. Figs. 8 and 9 are enlarged detail views showing the punches and die-block, in plan in Fig. 8 and in elevation in Fig. 9. Figs. 10, 11, and 12 are enlarged detail views of part of the selecting mechanism. Figs. 13 and 14 are enlarged detail views, in plan and side elevation, of the punching and spacing contact-points and the arrangements connected therewith. Figs. 15, 16, 17, and 18 are detail views of the combined spring and friction coupling between the shaft of the motor shown in Fig. 3 and the shaft carrying the spacing-ratchet and sprocket-wheel. Fig. 19 is a front elevation of the lever-locking device, and Fig. 20 is a plan view of the same. Fig. 21 is a diagram showing the electrical connections of the perforator.

Referring to Fig. 4, the machine consists of a base 1, to which is attached a metal framework 2, which supports the magnets, keys, selecting device, and other mechanism. The keys 3 are pivoted on the rod 4 and normally held upward against the bar 24 by the springs 25. On the under part of each key different arrangements of slots 5 are cut. When a key is depressed, this slotted portion selects and depresses one or more of the fiddle-bows 6. (See Figs. 2 and 3.) Pivoted on the same shaft 4 as the keys and arranged alternately with them, as shown in Fig. 3, are a series of levers or "kickers" 7, whose number depends on the maximum number of holes that it may be desired to punch in the tape within any letter-space of the alphabet employed. In the drawings the invention is shown with ten kickers, this being the number required for the printing-telegraph system described in my said prior granted patents. The kickers are adjustable relatively to the fiddle-bows by means of the set-screws 8 and are pressed upward against the fiddle-bows by the springs 26. At the other end of the kickers there is a hook 9, (most clearly seen in Figs. 10, 11, and 12,) which engages with a strap 10 and rivet 11, attached to the lower end of the bell-crank levers 12, which are pivoted on the frame of the machine at 13. The top ends 14 of these levers are connected by pins 15 16 and links 17 to small angle-pieces 18, which are pivoted at 19. The range of motion of these angle-pieces is limited by the plates 51 and 52. Attached to these angle-pieces are springs 20, which are fixed at one end in slots 21 in the angle-pieces 18. The springs 20 rest against the projecting tongues 22 of the angle-pieces 18. This arrangement allows the springs 20, with their punch-blocks 23, to be freely depressed, but prevents them vibrating, as they would do without this support. Such vibration would be most detrimental, as it causes the punch-blocks to strike against adjoining mechanism, and though it does not prevent their rapid withdrawal it obstructs rapid return to normal position. (Shown in Fig. 4.) A shaft 27 is pivoted between the screws 28 29, Fig. 7. Rigidly attached to this shaft are two thin sheet-steel bell-crank levers 30 31, arranged about an inch apart parallel to one another on said shaft, Figs. 4, 6, 7. Brazed crosswise to the outer extremities of these levers are two short universal striker-bars 32 33, which extend over each of the two rows of five punches 34 35. To the lower extremities of the bell-crank levers 30 31 is attached a soft-iron armature-bar 36, which is controlled by the electromagnet 37. This punch-striking mechanism is held normally retracted by the spring 43, which is attached to the post 95, Figs. 6 and 7. The screw 96, Fig. 7, serves as the back-stop for the armature 36 of the punching-magnet. 38 is a die-block. (Shown in section in Fig. 4 and enlarged in Figs. 8 and 9.) The punches pass through two hardened-steel guide-plates 39 and 40, Fig. 9, and may be driven into the holes in the hardened-steel die-plate 41. The two guide-plates and the die-plate are dovetailed into the die-block and locked by means of the tapering pin 42. By knocking out this pin the die-plate 41 may be removed for sharpening. The paper tape to be perforated is introduced sidewise into the thin slit 44 between the punches and the die-plate. 45 46 are springs for retracting the punches after perforating the tape. At one end they are fixed in holes in the blocks 47 48. At the other end they are reduced in diameter sufficiently to permit them to pass through holes drilled in the heads of the punches. The portions of the springs which project through the punches rest against the stop 49, Figs. 8 and 9, which regulates the height to which the punches can rise. The disks punched from the paper tape pass down through the tube 50 to the floor.

The operation of the mechanism so far described can be understood best from Figs. 4 and 5. When a key 3 is depressed, it forces down one or more of the fiddle-bows 6. These in their turn depress corresponding kickers 7. The hooks 9 are thrust forward, and with them the straps 10 and the perpendicular portion of the bell-crank levers 12. The horizontal portions of one or more of the levers 12 are thus lifted about one-sixteenth of an inch. This motion is communicated, by means of the pins 15 and 16 and the links 17, to the angle-pieces 18, which tilt on their pivots 19, as shown in Fig. 5. One or more of the punch-blocks 23 are in this way withdrawn from over the punches 34 35. The consequence is that when the magnet 37 is energized and attracts the armature 36 the universal striker-bars 32 33 strike down on the punches, but only operate those from which the punch-blocks 23 have not been withdrawn. In this way by depressing various keys it is possible to operate any combination of one or more punches required to perforate the tape to represent a letter. It is obvious that the action of this selecting mechanism may be reversed, so that the punch-blocks would normally rest in the outward position shown in Fig. 5 and would be thrust over the punches by depressing any required key. The arrangement already described is preferable in a fast-operating machine, because the punch-blocks that have to take part in the operation of punching any particular letter are stationary, not having been shifted the instant before they are struck. In the reverse arrangement, in which the punch-blocks are thrust inward, there is hardly sufficient time for them to come to rest when the keys are operated rapidly, the result being that some punches are liable to miss.

The spacing mechanism is shown in Figs. 1, 2, 3, 6, and 7 and in Figs. 15, 16, 17, and 18. Referring to Fig. 7, rigidly attached to the shaft 56 there is a small sprocket-wheel 53, which feeds the tape 57 along by means of the central line of perforations. (See Fig. 3.) Rigidly attached to the same shaft as the sprocket-wheel is a small ratchet-wheel 54, controlled by an escapement-anchor 55, which is pinned to the shaft 62. The tape 57 passes up over the guide-plate 58, through the die-block, over the sprocket-wheel 53, and down over the serrated steel knife-blade 64 and out of the machine. The plate 64 (shown also in Fig. 2) is used as a support against which to tear off a section of tape when that is necessary. The tape is kept in contact with the sprocket-wheel 53 by the small rollers 59 60, carried by the spring snap-lever 61. When inserting the tape, this lever is thrown back to the position shown in dotted outline, and when the tape is adjusted on the sprocket-wheel the lever 61 is snapped back into normal position again. Referring now to Fig. 6, on the shaft 62, carrying the escapement-anchor, there is also rigidly attached an armature 65, which is normally held against the back-stop 66 by the spring 67. This armature 65 is controlled by the spacing-magnet 68, which thus controls the escapement-anchor, the ratchet 54, and the sprocket-wheel 53. The shaft 56, carrying the sprocket-wheel, is driven by any suitable motor, such as the small electric motor 138 shown in Fig. 3. In a machine of this character it is essential that the operation of feeding the tape shall be as rapid as possible, because upon the rapidity of the feed of the tape depends to a great extent the speed at which the machine can be operated. To start the feed rapidly, the sprocket-wheel 53 and its connections must be very light, so as to be able to snap around one step the instant they are permitted to do so by the movement of the escapement-anchor. There are three ways in which the sprocket-wheel may be driven by the motor. The first is to drive the motor at a high speed and connect it by a friction-coupling to the shaft carrying the sprocket-wheel. The escapement-anchor has then to resist the friction which tends to rotate the sprocket-wheel. To render this means effective, the motor has to be run at a high speed in order to give the sprocket-wheel sufficient peripheral velocity to feed the tape rapidly. The humming of the motor is then objectionable, there is considerable wear and tear, and it is difficult to maintain the friction sufficiently uniform. The second means is to drive the sprocket-wheel by means of a watch-spring, one end of which is connected direct to the shaft carrying the sprocket-wheel and the other end to the inside of a drum, which is kept wound up by the motor. With a small motor it is very difficult to avoid either over or under winding the watch-spring, with consequent irregularity in the rate of feed. The third means, which forms part of my improvement, consists in combining said friction and spring devices. With this arrangement the motor can be run at a low speed—about three hundred revolutions per minute—and by adjustment of the friction the watch-spring is kept wound up to any degree desirable. This arrangement is shown in Figs. 1, 2, and 3 at 69 and 70 and in detail in Figs. 15, 16, 17, and 18. Fig. 15 is a section through Fig. 17 on the line K L. Fig. 16 is a section on the line M N, Fig. 17; and Fig. 18 is a section on the line O P, Fig. 17. 69 is a thin steel drum revolving freely on the shaft 56, to which is fixed the sprocket-wheel 53. 76 is the shaft of the motor. On this shaft is fixed a collar 70, expanded at the outer end into a disk 77, in which are two slots to hold the springs 73 74 from moving sidewise. The springs 73 74 are attached to the collar by the adjusting-screws 78 79, the disk acting as a fulcrum. Small pads of hard felt 71 72 are riveted to the free ends of the springs 73 74. These felt pads rub against the inner surface of the steel drum 69. Attached by one end to the drum, as shown in Fig. 18, is a watch-spring 75, the other end being attached to the shaft 56. The drum 69 is kept in place only by the attachment of the spring 75 to the shaft 56. In practice this is found to be sufficient. The rotation of the motor-shaft causes the friction-pads to keep the watch-spring 75 wound up, thus supplying quick-acting power to drive the sprocket-wheel. The result is that every time the spacing-magnet 68 is energized and deënergized the tape is fed forward the length of one letter-space.

The punching and spacing magnets are operated alternately by two electric contacts. The arrangements connected with these contacts are shown at 80, Figs. 1, 2, and 6 and in enlarged details in Figs. 13 and 14. Inspection of Figs. 2 and 3, and preferably the latter, will show that while the ten fiddle-bows 6 are pivoted so as to rock up and down on the same shaft 4 as the keys 3 and the kickers 7 there is an eleventh fiddle-bow 81, which rocks on a separate shaft 82. This outside fiddle-bow, which is operated by each and all the keys, controls the punching and spacing contacts. The ten kicker fiddle-bows are held up by the kicker-springs; but the fiddle-bow 81 is held up by springs 83 84. Projecting upward from 81, as shown in Fig. 6, is a section of thin tube 85, flattened at the lower end for attachment to the fiddle-bow and at the top to carry a short insulated arm 86, projecting horizontally at right angles to 85. This arm carries double contact-points 87 88, electrically united, which make contact alternately with the punching and spacing circuits as the various keys are depressed and released, the keys depressing the fiddle-bow 81, and thus rocking the contact-arm 86. Referring to Figs. 13 and 14, Fig. 13 is a plan view, and Fig. 14 is a side elevation. The contact-arm 86 makes contact alternately with the punching-contact 91 and the spacing-contact 94. Normally when the keys are not being depressed the arm 86 remains in contact with the spacing-contact 94. Consequently when circuit is closed preliminary to operating the machine, the spacing-circuit being closed, the spacing-magnet 68 is energized and attracts its armature 65. The escapement-anchor 55, Fig. 7, is thus drawn over, so that a tooth of the ratchet is retained by the arm 63 of the anchor. This is the normal condition of the spacing mechanism, the feeding of the tape being effected by the breaking and closing of the spacing-circuit. When a key is depressed, the spacing fiddle-bow 81, Figs. 13 and 14, breaks the spacing-contact 94 the moment the key is touched. This releases the armature of the spacing-magnet, the anchor flies back, and the sprocket-wheel feeds the tape forward about one-third of one letter-space. The further depression of the key carries the contact-arms, Fig. 14, over to the punching-contact 91. The moment this happens the punching-armature 36, Fig. 4, is attracted by its magnet, and the striker-bars 32 33 strike down the selected punches, driving them through the paper tape. On releasing the key the punching-circuit is broken, the striker-bars fly up again, the punches are drawn out of the tape, and then the moment the contact-arm 86 touches the spacing-contact 94 the spacing-circuit is closed again and the paper tape is fed forward the remaining two-thirds of the letter-space. What actually happens is that just prior to depressing a key one-third of the last letter punched remains under the punches. The breaking of the spacing-circuit by depressing a key moves the tape forward one-third of a letter-space, thus bringing a new letter-space in proper alinement under the punches. In order that the machine may work rapidly, it is necessary to have a considerable gap between the punching and spacing circuit contacts, so as to allow time for the tape to feed before the punching begins. Set-screws 89 90, Figs. 13, 14, are provided for adjusting this gap. They are insulated and carried by two posts attached to a bracket 80, which is screwed to the frame of the machine. Experience shows that there is a decided tendency on the part of the contact-arm 86 to chatter on the contact 94 when a key is suddenly released, and this chattering feeds the tape forward several spaces after each letter. To obviate this difficulty, I make the mechanism very light and employ a yielding spring-contact 92, Fig. 13, with a limiting-stop 93, allowing a movement to the spring of about one sixty-fourth of an inch. This spring-contact prevents the contact being broken by any slight vibration of the contact-arm, and by making the fiddle-bow and contact-arm very light and holding them up firmly by the springs 83 84 chattering is prevented. A very thin light fiddle-bow offers but slight resistance to torsion, and consequently if it is pivoted on shaft 4 with the other fiddle-bows when the key Q, Fig. 2, is depressed, owing to the twisting of the fiddle-bow, the contact-arm hardly breaks the spacing-contact and will not touch the punching-contact, though letter "P" at the other end of the keyboard works perfectly. I therefore provide a separate shaft 82, Figs. 3, 13, and 14, to which the light fiddle-bow is rigidly attached at both ends. The shaft 82 then takes up the torsional strain, and the fiddle-bow is not distorted by the depression of any key. These arrangements abolish chattering, and the keyboard of the machine may be operated as fast as that of any type-writer.

Referring to Figs. 8 and 9, it is necessary to be able to remove the punches readily in order to be able to sharpen or replace them by new punches. This is readily done with the mechanism shown by forcing up the under sides 97 98 of the springs 45 46 out of their holes in the blocks 47 48. The springs can then be pulled out of the punches and the punches pulled out of the die-block. To facilitate the operation, the die-block itself is made readily removable, the screws 99 100, which hold the die-block down firmly on the frame 2 of the machine, engaging in slots 101 102, cut in the two wings of the die-block. A single turn of each of these screws releases the die-block, and it can then be readily removed. The paper-guide plate 58 is provided with two flanges 103 104 to guide the tape, and in order to prevent the tape jumping out of the guide there is provided a spring snap-lever 105, to which there is attached a projecting wire rod 106, which fits into notches in the flanges of the guide-plate and keeps the tape in place. To remove the tape, the lever 105 is thrown down to the dotted position shown in Fig. 9, and the roller-lever 61, Fig. 7, is also thrown over to its dotted position. The tape can then be readily slipped out or inserted sidewise.

In the printing-telegraph system described in my said prior granted patents when printing long messages, such as press-despatches, there is no difficulty in stopping the printer at any appropriate place near the end of a line and running the type-writer carriage back; but when handling short messages, such as commercial telegrams, consisting mostly of short lines which cannot be arbitrarily divided like a press-despatch, it is necessary to have a break-signal which will automatically stop the printing mechanism at the end of each line. This break-signal has to be transmitted like any other letter by perforating it in its appropriate place in the transmitting-tape. In order to insert the break-signal at appropriate intervals, it is necessary to have a locking device to prevent a perforator operator exceeding the length of a line before inserting the break-signal. For this purpose I have devised a locking or blocking device, which is shown immediately under the keyboard in Fig. 1, also in front elevation in Fig. 19, and in plan, with the keyboard removed, in Fig. 20.

Referring to Figs. 19 and 20, 107 is a letter-scale. 108 is an actuator which is attached to the chain or cord 109 and slides step by step along the scale as each key is depressed. This movement is secured by having the counting-magnet 110 included in the circuit of the spacing-magnet, so that every time the spacing-magnet is operated the counting-magnet attracts its armature 111, pivoted at 112, and depresses the arm 113, with its pawl 114. This pawl strikes the ratchet-wheel 115 and moves it around the extent of one tooth. A wedge-shaped stop 116 prevents overfeeding, and the holding-pawl 117 keeps the ratchet from flying back. On the same shaft as this ratchet and secured to it is a small drum 118, containing a watch-spring. The cord or chain 109 winds up and unwinds from the drum as the ratchet is stepped around by the counting-magnet in opposition to the watch-spring in the drum. In this way the indicator 108 is moved along till it comes to the end of the line. It then strikes an upward prolongation 119 of a light toothed bar or lock-bar 120, which slides back and forth about one-sixteenth of an inch on the screws 121, the screw-holes being slotted sufficiently to permit the motion. The spring 124 normally keeps the bar 120 to the left, so that the teeth of the bar do not obstruct the downward motion of the keys 3. When the actuator 108, carried along by the chain or cord, strikes the prolongation 119, the toothed lock-bar 120 is moved to the right and the teeth 151 are brought under the keys 3, thus locking or preventing them from being depressed. It is now necessary to depress the one unlocked key, which will insert the break-signal in the tape and at the same time release the indicator, so that it will return to the beginning of the scale, ready to advance the actuator for the next line and also unlock the keys. In transmitting commercial telegrams by this system it is found preferable to use capitals and figures only. The capital shift-key, therefore, not being required for commercial telegrams, it is available for use as a break-signal key. The tooth 152 of the locking-bar, which would otherwise lock the capital-key like all the other keys, is therefore cut away, so that the capital-key is free to be depressed when all the others are locked. The capital-key is in position to engage the end 122 of the pawl 117. When the actuator has come to the end of the line and locked the machine, the capital-key is depressed. This punches in the tape the group of perforations composing the break-signal. It also breaks the spacing-circuit, and therefore deënergizes the counting-magnet 110, which releases its armature 111 and pawl 114. The capital-key also strikes the end 122 of the pawl 117, tilts the pawl up, and allows the ratchet-wheel to fly around under the influence of the spring in the drum. This carries the actuator back to the beginning of the line, the exact point being fixed by the Geneva stop 123 on the ratchet-wheel. In order to moderate the speed with which the actuator flies back to the beginning of the line, a small vibrating anchor 153 engages with the teeth of the ratchet. The pressure of the indicator on the projection 119 being removed, the bar 120 is thrown back to its normal position by the spring 124. The depression of the capital-key, therefore, perforates the break-signal in the tape, returns the actuator to the beginning of the line, and unlocks all the keys ready for the next line. Occasionally it is desirable to run the actuator back to the beginning of the line without punching a break-signal in the tape. This is done by means of the key 125, which on being depressed short-circuits the controlling-magnet 110 without affecting the spacing or punching magnet and trips the pawl 117 by means of the hook 126 and the pin 127. The switch 128 is for cutting the lock-controlling mechanism into or out of action, as desired.

The general plan of the circuits of the machine is shown in the diagram Fig. 21. The current to run the motor 138 is supplied to the binding-posts 129 130 and the motor is started or stopped by the switch 137. The current to operate the punching and spacing magnets, which for convenience may be drawn from an electric-lighting circuit, enters the machine at the binding-post 136. When no key is being depressed, the contact-arm 86 rests in contact with 94 and current passes from the binding-post through the contact-arm 86, contact-point 94, wire 141, switch 128, wire 142, binding-post 133, resistance 140, binding-post 132, wire 143, magnet 68, switch 139, wire 144, and out through the binding-post 131 back to the source of power. The spacing-circuit is therefore always closed except when a key is depressed, the feeding of the tape being therefore effected by the momentary breaking of a closed circuit. When a key is depressed, contact-arm 86 goes over to contact 91 and the current passes through wire 148, punching-magnet 37, wire 149, switch 139, wire 144, and out through the binding-post 131 back to the source of power. When the switch 128 is in the position shown in the diagram, the locking mechanism is cut out and inoperative. When the tape has to be perforated with commercial messages, which as a practical necessity require the use of break-signals to indicate the end of lines, the locking mechanism has to be employed. The switch 128 is then thrown over to contact 150. This cuts in the locking mechanism. Magnet 110 is in the same circuit as the spacing-magnet 68. It therefore operates by the momentary opening of the normally closed spacing-circuit. When it is desired to release the locking-magnet independently of the spacing-magnet, the short-circuit key 125 is depressed, cutting out the magnet 110 by the short circuit from wire 145, through key 125 and wire 147, to wire 146. The switch 139 is in the common return branch of the punching and spacing circuits. Opening this switch therefore cuts off the current by means of which the machine is operated. Closing the two switches 137 and 139 makes the machine ready for operation. The punching-magnet 37 requires much more current to operate it than the spacing-magnet. As this latter magnet is small the extra resistance 140 has to be placed in the spacing-magnet circuit to reduce the current when it is flowing through the spacing-circuit. The locking-magnet 110 has about the same resistance as the extra resistance 140. Consequently it will be seen that the switch 128 is so arranged that when it cuts in the locking-magnet it cuts out the extra resistance 140. To obviate trouble caused by sparking at the contact-points 91 94, it is necessary to bridge the gaps with the usual arrangement of a condenser and resistance in series connected between binding-posts 134 and 136 and 135 and 136, with their connections provided for this purpose.

What I claim, and desire to secure by Letters Patent, is—

1. In a keyboard-perforator the combination of a series of independent keys, a series of independent punches arranged to perforate a tape or strip, an operating or striking device common to all said punches, a series of independently-movable mechanical devices arranged to make and break the mechanical connection between said punches and striking device, means for operating said striking device by the depression of a key, and means for changing the position of one or more of said mechanical connecting devices during the movement of a key-lever and prior to the operation of the striking device.

2. In a keyboard-perforator the combination of a series of independent keys, a series of independent punches arranged to perforate a tape or strip, an operating or striking device common to all said punches, a series of movable mechanical connections normally in position to connect said punches and striking device, an electromagnet to operate said striking device, a circuit therefor, a circuit-closer operated upon the depression of a key and means whereby one or more of said mechanical connections is removed during the depression of a key and prior to closing the circuit.

3. In a keyboard-perforator the combination of a series of independent key-levers, a series of separately-movable punches arranged in two parallel, equidistant and coextensive rows to perforate a tape or strip, a striking device to simultaneously actuate said punches and means for dividing said punches into two groups and subjecting one group to the action of said striking device consisting of a series of separately-movable sections or blocks, one for each punch, each section being supported upon a hinged or pivoted arm and a separately-movable mechanical connection between each block and said key-levers.

4. In a keyboard-perforator the combination of a series of independent key-levers, a series of separate, uniform punches arranged in two parallel, equidistant and coextensive rows, a striking device for said punches, a series of sections or blocks, one for each punch, each block supported upon the free end of a hinged or pivoted lever and movable in the arc of a circle and means for shifting the position of one or more of said blocks to subject one or more punches of each row to the action of the striking device.

5. In a keyboard-perforator the combination of a series of independent key-levers, a series of separate, uniform punches arranged in two parallel, equidistant and coextensive rows, a striking device for actuating said punches, a series of blocks, one for each punch, each supported upon a hinged or pivoted arm, and movable into and out of line with said punches, respectively, a mechanical connection between each block and said key-levers, and means for feeding a tape or strip a uniform distance upon each complete operation of the striking device.

6. In a keyboard-perforator the combination of a series of independent key-levers, a series of separate, uniform punches arranged in two parallel, equidistant and coextensive rows, a striking device for actuating said punches, a series of blocks, one for each punch, supported upon a hinged or pivoted arm, and movable into and out of line with its punch, a mechanical connection between each of said arms and said key-levers, means for feeding a tape or strip a uniform distance upon each complete operation of the striking device, an electromagnet to operate the striking device, an electromagnet to operate the spacing device, electric circuits and connections therefor, and a circuit-controlling device operated by the movement of the key-levers.

7. In a keyboard-perforator, a series of independently-movable, uniform punches arranged in two parallel, equidistant and coextensive rows to perforate a tape or strip in parallel lines, a universal striker-bar for said punches, a series of independently-movable key-levers, means for subjecting one or more of said punches to the action of the striker-bar upon the depression of a key-lever, an electromagnet to operate the striker-bar, an electric circuit therefor, and a circuit-closer operated by the key-levers.

8. In a keyboard-perforator a series of independently-movable punches arranged in two parallel, equidistant and coextensive rows to perforate a tape or strip in parallel lines, a striker-bar for said punches, a series of independently-movable key-levers, means for subjecting one or more of said punches to the action of the striker-bar upon the depression of a key-lever, a motor-driven sprocket-wheel and an escapement therefor to advance the tape or strip a series of successive uniform steps upon each operation of the striker-bar, an electromagnet to operate said bar, an electromagnet to operate said escapement, an electric circuit therefor, and a circuit-closer controlled by the key-levers.

9. In a keyboard-perforator a series of independently-movable punches arranged in two parallel, equidistant and coextensive rows to perforate a tape or strip, a universal striking device for the punches, a series of independently-movable key-levers, means for subjecting one or more of the said punches to the action of the striker-bar upon the depression of a key-lever, a motor-driven sprocket-wheel having an escapement arranged to advance the tape or strip, step by step, a uniform step or distance at each operation of the striker-bar, an electromagnet to operate the striker-bar, an electromagnet to operate the escapement, an electric circuit for said magnet, a normally open branch of said circuit including the coils of the striker-bar magnet, a normally closed branch of said circuit containing the coils of the escapement-magnet and a circuit-closer operating break-points in said branch circuits alternately, under control of said key-levers.

10. In a keyboard-perforator the combination of a series of separately-movable punches arranged to perforate a tape or strip, a universal striking device for said punches, an electromagnet with its circuit and circuit-closer to operate said striking device and means to advance the tape or strip a uniform distance upon each complete operation of said striking device, said means including an electromagnet, an electric circuit and circuit-closers controlled by the key-levers, so arranged that the depression and release of a key first operates the escapement-magnet, second the punching-magnet, and third, the escapement-magnet, in the order named, to produce sectional advance movements of a single uniform step or letter-space of the paper-feed.

11. In a keyboard-perforator the combination of a series of independent key-levers, a series of separate punches, a universal striking device for said punches, a movable block for each punch, carried upon a pivoted lever, a hinged mechanical connection between each lever and a series of pivoted block-selecting devices, means for actuating one or more of said selecting devices upon the depression of a key-lever, an electromagnet for operating said striking device, an electric circuit therefor, and a circuit-closer operated by the key-levers.

12. In a perforator a series of independently-movable punches in combination with means for actuating one or more of said punches, consisting of a universal striking device, a movable block for each punch, a series of pivoted levers or "kickers" in number corresponding to the number of punches, a separable mechanical connection between said levers or "kickers" and said blocks, respectively; and means for actuating one or more of said levers consisting of a series of independently-movable key-levers characteristically slotted and a series of hinged strips or "fiddle-bows."

13. In a perforator a series of independently-movable punches in combination with a universal striking device, a movable block for each punch supported upon a pivoted lever, a series of pivoted levers or "kickers" in number corresponding to the number of punches, a mechanical connection between said levers or "kickers" and the levers supporting said blocks, respectively, and means for actuating one or more of said levers or "kickers" consisting of a series of independently-movable key-levers characteristically slotted upon their contact-surfaces and a series of hinged strips or "fiddle-bows" in position to engage with said levers or "kickers."

14. In a perforator an electromagnetic punching device and an electromagnetic spacing device, an electric circuit for the electromagnets having two branches, a punching-magnet in one branch, a spacing-magnet in the other branch, a series of independent key-levers, a normally closed circuit-breaker in the escapement-magnet branch, a normally open circuit-closer in the punching-magnet branch, and means whereby the depression of a key operates said circuit-breaker.

15. In a perforator the combination of a paper-punching device and a paper-feeding device, a motor-driven sprocket-wheel over which the paper strip is passed, a constantly-operating motor-driven shaft, a friction-clutch and a helical spring connecting the sprocket-wheel shaft with the motor-driven shaft and an electromagnetic escapement for said sprocket-wheel.

16. In a keyboard-perforator the combination of a series of separately-movable punches, means for selecting and operating one or more of said punches and means for advancing a paper strip step by step consisting of a constantly-operating motor-driven shaft, a sprocket-wheel and its shaft, a friction-clutch connected to said motor-shaft, a helical spring uniting said sprocket-wheel shaft to said clutch, an electromagnetic escapement for said shaft, an electric circuit in which the escapement-magnet is located and a circuit-breaker in said circuit controlled by the punching device.

17. In a perforator an electromagnetic punching device combined with an electromagnetic paper-feeding device and means for advancing the paper strip a uniform and equal step or space for each character perforated consisting of an electric circuit including said electromagnet and a circuit-closer controlled by the depression of a key to operate the escapement-magnet, the punching-magnet, and the escapement-magnet in the order named whereby said space or step is produced by sectional advance movements.

18. In a perforator the combination of a series of independently-movable punches, a punching-magnet, a spacing-magnet, an electric circuit for said magnet, a series of independent key-levers, separable mechanical connections between the key-levers and the punches including a series of pivoted spring-retracted levers or fiddle-bows, a circuit-closer in said circuit and means for operating said circuit-closer by the depression of a key-lever consisting of a spring-retracted lever or fiddle-bow on an independent support arranged parallel with the said series of fiddle-bows and an operating connection between said fiddle-bow and the movable element of said circuit-closer.

19. In a perforator the combination of a punching device, a spacing device, a series of independent key-levers and means for blocking the movement of said key-levers at a predetermined point consisting of a locking-bolt normally out of engagement with said levers, a traveling actuator therefor, a pawl and ratchet mechanically connected to said actuator, an electromagnet to operate said pawl, an electric circuit therefor and a circuit-closer in said circuit operated by the spacing device.

20. In a perforator the combination of a punching device, a spacing device, a series of independent key-levers, and means for blocking the movement of said key-levers at a predetermined point consisting of a toothed strip normally out of engagement with said levers, an actuator therefor advanced step by step to move said strip, a retracting device for said strip, a pawl and ratchet to operate said actuator and means for operating said pawl upon the operation of the spacing device.

21. In a perforator the combination of a punching device, a spacing device, a series of independent key-levers to control the punching and spacing devices and means for blocking the movement of said key-levers at a predetermined point in the operation of perforating consisting of a spring-retracted toothed strip, an actuator therefor, a pawl and ratchet to advance said actuator step by step and an operating connection between said pawl and the said key-levers.

22. In a perforator the combination of a punching device, a spacing device, a series of independent key-levers, a locking device for said key-levers, an actuator for said locking device, a pawl and ratchet to advance said actuator step by step, a retracting device for said actuator, a retracting device for said locking-bolt and means for releasing the actuator-retracting device.

23. In a perforator the combination of a punching device, a spacing device, a series of independent key-levers, a locking device for said key-levers, an actuator for said locking device, a pawl and ratchet to advance said actuator step by step, an electromagnet to operate the pawl, an electric circuit therefor, and a circuit-closer in said circuit operated by the depression of a key-lever.

DONALD MURRAY.

Witnesses:
THEODORE L. CUYLER, Jr.,
A. M. DONLEVY.